United States Patent [19]

Wood et al.

[11] 4,246,656
[45] Jan. 20, 1981

[54] DIVERSITY SWITCH CORRELATION SYSTEM

[75] Inventors: Wilhelm A. H. Wood, Walpole; Darrel J. Peterson, Plymouth, both of Mass.

[73] Assignee: Raytheon Company, Lexington, Mass.

[21] Appl. No.: 954,259

[22] Filed: Oct. 24, 1978

[51] Int. Cl.³ .............................................. H04B 7/08
[52] U.S. Cl. ..................................... 455/136; 455/52; 455/276; 455/304
[58] Field of Search ............... 325/302, 304, 305, 306, 325/324, 369, 370, 476, 56; 328/55, 63, 72, 155, 104, 154; 307/262, 269; 178/69.1; 455/133–137, 52, 303, 304, 272, 276

[56] References Cited

U.S. PATENT DOCUMENTS

| | | | |
|---|---|---|---|
| 3,364,428 | 1/1968 | Kahn | 325/305 |
| 3,430,156 | 2/1969 | Katzin | 325/56 |
| 3,528,012 | 9/1970 | Kahn | 325/304 |
| 3,660,647 | 5/1972 | Pryor, Jr. | 328/55 |
| 3,864,633 | 2/1975 | Strenglein | 325/304 |
| 4,019,143 | 4/1977 | Fallon et al. | 328/72 |
| 4,079,318 | 3/1978 | Kinoshita | 325/305 |

Primary Examiner—Marc E. Bookbinder
Attorney, Agent, or Firm—H. W. Arnold; J. D. Pannone; M. D. Bartlett

[57] ABSTRACT

A multiple-channel microwave communications system with an improved diversity switch permitting the system to be constructed without the necessity of equalizing channel delays wthin a ½ bit period by adjusting coaxial cable lengths. The average clock frequency is made to be the on-line channel frequency. The off-line clock frequency is forced to assume the on-line clock frequency by shifting the off-line clock one-half bit, that is 180°, when it is advanced or delayed more than 180°. Phase shifters of 180° are provided in each channel but with only the off-line channel permitted to shift. In addition, the bit content of the dual channel receiving system is aligned over a plus or minus three-bit range by a correlation loop circuit.

14 Claims, 5 Drawing Figures

DIVERSITY SWITCH CORRELATION SYSTEM

BACKGROUND OF THE INVENTION

This invention relates to a multiple channel microwave communications system and more particularly to a microwave communications system utilizing an improved diversity switch system which selects one of two data channels in which delays between the individual data channels are electronically equalized without the necessity of utilizing mechanical adjustment means such as coaxial cable lengths to match the on-line data or reference channel to that of the off-line or non-selected data channel.

In previous diversity systems precise data alignment had to be made so that the diversity switch could select from either source without introducing errors or losing data bits. For example, the bits from one channel had to be aligned in time with corresponding bits from another channel to permit selection of the optimum channel for the most error free transmission over a communications link. To achieve this uninterrupted operation, some form of absolute delay equalization had to be employed, particularly when modules having different delay characteristics were used. This was the case in a four-phase system in which delay differences of up to one-half a bit were common. In an eight-phase system, now widely used, compensation of delay differences of up to one bit were considered necessary in order to permit module replacement without readjusting for delay variations. This required the incorporation of discrete bit shifting in addition to a one-half bit delay achieved by inverting the clock to provide a 180° phase shift in the timing circuit for each data line. Such adjustment to compensate for delays became difficult and inconvenient to perform.

Another common problem arises when the non-selected off-line channel of a diversity switch system fades. Errors are thereby created in the on-line data channel by changing the frequency of the timing or average clock for each channel. This makes the diversity switch useless under fading conditions.

Such fading also results in the off-line channel operating at an incorrect frequency and no alarm signal is given to inhibit its own clock output from reaching the clock averaging circuit, which results in incorrect timing of the average clock for both channels. When this condition occurs, the off-line channel creates errors in the on-line channel.

SUMMARY OF THE INVENTION

It is therefore an important object of the invention to provide an improved diversity switch system which is capable of automatic alignment of the two data streams and switching between them without introducing bit errors during periods of atmospheric fading or switching for maintenance purposes.

It is another object of the invention, to prevent the off-line or non-selected diversity channel from initiating errors in the on-line diversity channel of a dual channel communications system during fading conditions.

It is a further object of the invention to provide an improved diversity switch system which permits independent operation of a selected optimum data stream without degradation by fading or failure of the off-line or non-selected channel.

In accordance with the invention, a dual diversity system comprises an on-line status information source together with separate timing inputs to provide clock signals which clock input data into each channel from separate data sources; each timing clock signal feeds an exclusive OR circuit, the output of which feeds one input of a dual input phase comparator and also selects in response to the output of the phase comparator a one-half or one-bit delay in each data channel. The phase comparator detects the phase difference between the timing signals of the on-line reference channel and the off-line channel. An error signal representing this phase difference is fed to a conventional slicer which measures in a well-known manner the detected phase difference. When the phase difference is greater than a predetermined number of degrees, the slicer transmits a signal to a well-known bi-stable logic gate which herein includes flip-flop means controlled by the on-line status information source to determine the data channel which is to be shifted one-half bit with respect to the other data channel. The off-line phase detected bit is then transmitted in the form of a control signal to the off-line channel to change the phase of the output of the exclusive OR circuit by 180°, thereby utilizing either the one-half or one-bit delay to bring the off-line channel in phase with the on-line channel whenever it is advanced or delayed more than 180° with respect to the on-line channel. In this manner, the data bits of the two streams are aligned to compensate for delay variations of from + one-half to − one-half bit.

To align for delay differences of several bits between the two data streams, for example, ± three-bits, the singularly aligned data streams are fed to a corresponding pair of eight-bit shift registers wherein descrete bit shifting forward or backward is performed to correlate the serial data of each channel on a bit-by-bit basis. In particular, a clock averaging circuit at the output of each exclusive or circuit is used to clock each data channel output from the half-bit delay device into the corresponding eight-bit storage register. The output of each state thereof is connected to corresponding indivudual input stages of a conventional eight-bit multiplexer. In this way, a delay of from one to eight-bits can be achieved in either of the two multiplexer outputs by a three-bit address word applied to the associated multiplexer from an eight-bit binary counter. The output of each multiplexer is connected to a correlation counter which performs bit-by-bit comparison of the serial output of each multiplexer. This counter provides, in response to an on-line control or status signal originating in the receiving system, an error count signal which is fed back to well-known eight-bit correlation counters coupled to each multiplexer. The error signal shifts or varies the eight-bit counter, thus setting the multiplexer address lines to select the appropriate delay from one to eight-bits to match the off-line data with the on-line data. Normally, the on-line channel is preferably arranged to have a four-bit delay, by means of pre-setting the eight-bit counter, so that the off-line channel can compensate for either positive or negative delay variations with reference to the on-line channel. Thus, either channel can perform as the on-line channel depending on the polarity of the status or control signal from the diversity receiving equipment. This polarity is determined by well-known performance and fault monitors.

The transitions of each data bit, as well as the bit content are now aligned and fed to the dual input of a high speed electronic or so-called hitless or errorless switch which selects the on-line data channel in response to the control signal. The hitless switch is activated by the on-line status and clock signals to perform data transfer only during bit transition times. In this way, bit integrity is maintained and errorless switching from one channel to the other is achieved. The electronic or hitless switch in this embodiment comprises a well-known OR gage used in conjunction with a well-known edge triggered flip-flop which selects the on-line channel in response to the status switched signal. At the same time, the system differs from previous diversity switch systems by its ability to work with a synchronous non-correlated input data at the off-line input terminals. This is achieved by the capability of the one-half bit switch circuitry to dynamically insert or delete a one-half bit delay in response to the off-line phase shifter output activating the exclusive OR circuit to insert or delete the one-half bit delay. In this manner, the off-line non-correlated timing signal input is made to have the same frequency as the on-line timing signal and, thus, the clock averaging output is synchronous with the on-line timing signal. Thus, even though the off-line clock timing signal input has an incorrect frequency due to fading, for example, or equipment failure, the on-line signal frequency is preserved. The on-line or preferred data output line can then be fed to the demultiplexer of an associated receiving system.

In its broader aspects, the invention contemplates the use of a delay to correct for bit transition alignment differences of up to a one-half bit advance or delay in a diversity channel system. This is achieved by a phase detector in conjunction with an exclusive OR circuit and a delay flip-flop. This novel arrangement compares the timing signals which time the occurrence or transition of each bit in the two channels and applies a difference signal to the exclusive OR circuit which corrects the timing to actuate the one-half bit delay flip-flop to compensate for the one-half bit delay difference in either channel.

The invention also includes a shift register and multiplexer for each channel in conjunction with a data correlation counter which provides means to align the data bit content of either channel with the other channel over, for example, a three bit range. This is achieved by counting the number of sequential polarity agreements of the two data channels in the correlation counter and incrementing a binary counter to address the corresponding multiplexer to select the appropriately delayed input signal to provide a predetermined number of correct comparisons of the data bit content of each channel and thus determine a correct match of the data bits. Either of the two aligned data streams can then be switched to an output channel without interruption and in an errorless manner to obtain optimum diversity channel operation.

BRIEF DESCRIPTION OF THE DRAWINGS

For a more complete understanding of the invention, reference is now made to the following description of the accompanying drawings, wherein.

DESCRIPTION OF THE PREFERRED EMBODIMENT

Figure 1:
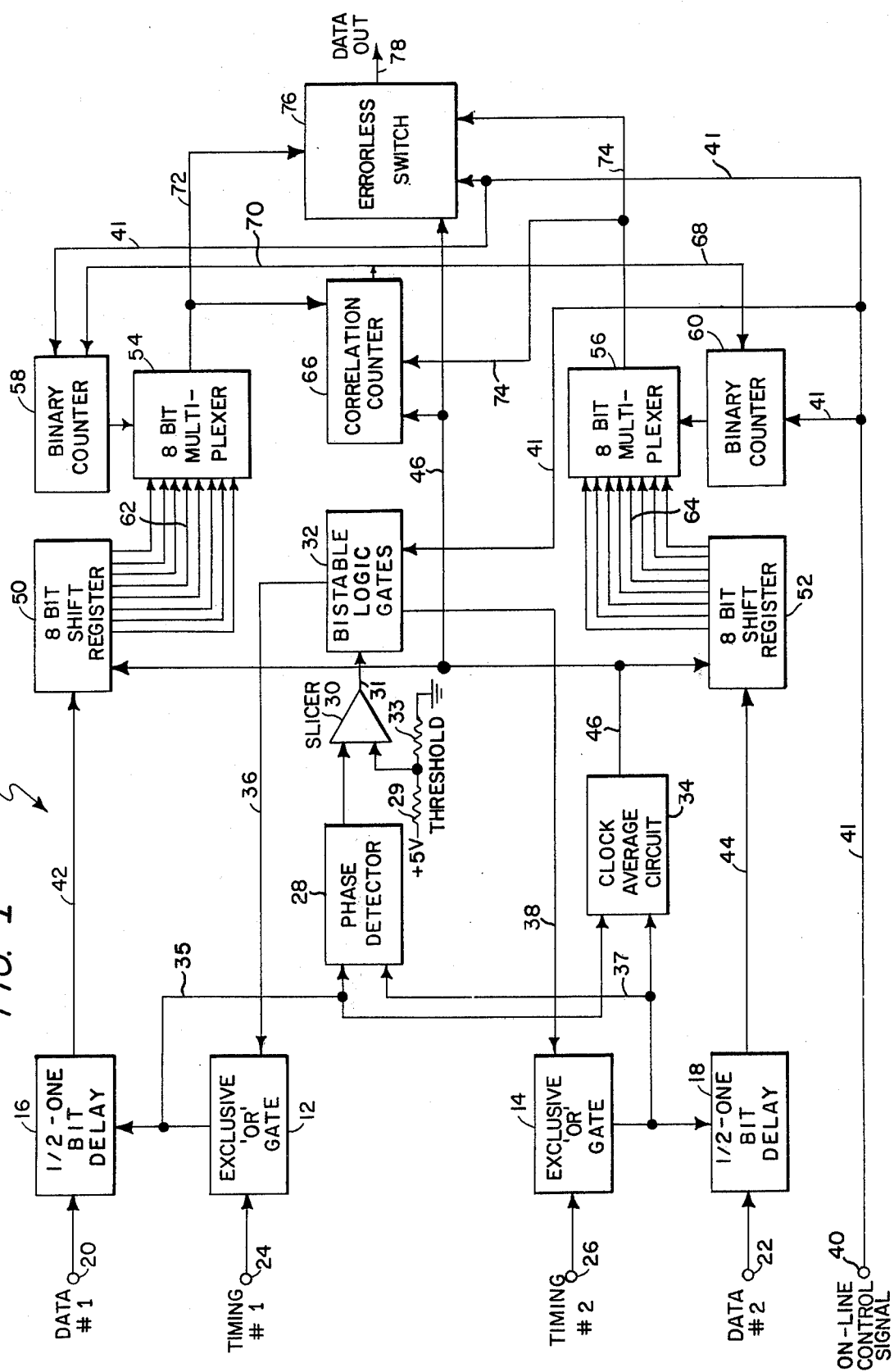
FIG. 1 is a block diagram showing the manner in which the bit content of the dual diversity data channels are aligned by the diversity switch correlation circuit.

Referring to FIG. 1, there is shown a diversity switch correlation loop circuit 10 having a pair of conventional exclusive OR gate circuits 12 and 14 feeding inverted or non-inverted timing signals to one-half or one-bit delay devices 16 and 18. These devices are inserted in corresponding diversity data channels No. 1 and No. 2 and connected to terminals 20 and 22, respectively. The exclusive OR gates are also connected to timing clock lines input terminals 24 and 26 which provide accompanying timing signals for the two data channels. These timng signals are generated for each channel in a well-known manner in associated receiving equipment. The outputs of the two exclusive OR gates are also connected to a well-known phase detector 28 which provides an output having a polarity and amplitude porportional to the phase difference between the timing output signals of the two exclusive OR gates. The output of the phase detector 28 is connected to a conventional slicer 30 which provides an output signal whenever the detected phase difference is greater than a predetermined level. A threshold level adjustment, comprising two resistors 29 and 33 in series, is available to set a predetermined phase level to actuate flip-flops included in a bistable logic gate circuit 32 which determines whether a one-half bit delay is to be inserted or deleted in the off-line channel to obtain a match at the transition point of each data channel bit.

Connected also to the exclusive OR circuit 12 and 14 is a well-known clock averaging circuit 34 which will be described in connection with alignment of the data contents of each channel. The two outputs of the bistable logic gate circuit 32 are fed back to the exclusive or gates 12 and 14 by way of lines 36 and 38, respectively. These gates, in response to on-line status or control signals from input terminal 40, and line 41 in conjunction with exclusive OR gates 12 and 14, determine whether to add a one-half or one-bit delay to the off-line channel. That is, the on-line status signal determines which channel is to be changed and the slicer output determines whether the change in the selected channel delay is to be one-bit or one-half-bit. Thus, for example, in response to input signals on lines 41 and 31, a signal is developed on line 38 which is fed to exclusive OR gate 14. The sense of this signal, therefore, determines whether a one-half or one-bit delay 18 is inserted by a well-known flip-flop 18. This is achieved by inverting the clock signal fed to the one-half or one-bit delay 18. In this manner, the data signals carried by data lines 42 and 44 are aligned to within one-half bit of each other.

Alignment of the one-half bit delay loop has thus been described. It now remains to perform the alignment of individual data bit content for the plus or minus three-bit range. To achieve this alignment, the clock averaging circuit 34 provides at its output on line 46 a mean clock signal resulting from averaging the phase difference of the two timing signals at its dual inputs from the exclusive or outputs on lines 35 and 37. This is achieved by well-known resistive summation means, not shown. This signal is used to serially enter the data bits on lines 42 and 44 into corresponding eight-bit shift registers 50 and 52. The bits of the data streams, although now aligned at their transition points, usually are either advanced or retarded due to differential path or equipment delays in the receiving equipment. The eight-bit shift registers are hold eight-bits of data. The eight stages of each shift register are connected to corresponding inputs on associated eight-bit multiplexers 54 and 56. In connection with multiplexer 54, a binary counter 58 is used to address a particular data stage connected to one of the eight input lines from the eight-bit shift register 50. The control signal on status line 41 then selects the on-line or master channel to which the off-line channel is to be placed or adjusted. The binary counter 58 is pre-programmed to select, for example, a centrally located line 62, which has at least three-bit positions before and three-bit positions following it, to provide the aforementioned three-bit range. For example, in this embodiment, there are three-bit positions prior to the first selected bit and four-bit positions following it. It is thus seen that the bit entering the fourth position or input stage of multiplexer 56 may be delayed or advanced with respect to the corresponding bit on line 62. These two bits are then fed out to a correlation counter 66, to be described in detail, which compares the polarity, that is, one or zero, to determine whether or not the polarity of the two compared digits are the same. When the compared bits are not the same, a signal is initiated by the correlation counter on line 68 which advances the off-line binary counter 60, thus advancing the input tap position of off-line multiplexer 56 to select a new data output line from shift register 52 for comparison by the correlation counter 66. This process of selecting new inputs in off-line multiplexer 56 continues until a bit containing the same polarity is located. For each correct correlation of polarity, the correlation counter 66 advances one position. This continues until, for example, thirty-two sequential correct comparisons have been determined. The correlation loop is then considered to be stable and correlation has been obtained for the two data streams, over at least a plus or minus three-bit range. If, during this counting process of correlation counter 66, an incorrect comparison occurs due to aforementioned system errors, the correlation counter is reprogrammed by an exclusive OR circuit to be described, which counts down or back by two positions for each incorrect comparison, thereby providing immunity to errors in the two data streams. Thus, it can be seen that in the presence of error free data correlation is achieved after 32 consecutively counted positions. In the presence of system errors the process takes longer before correlation of the two data streams in the presence of system errors is reached.

It should be understood that line 62 has been selected to carry the on-line data during this entire process. The remaining seven input lines from shift register 50 are used only when multiplexer 56 is selected to be the on-line or master channel by a control signal of opposite polarity on status line 41, the status or polarity of which is determined by well-known receiver system status monitors, not shown. Also, when the multiplexer 56 is selected to be on-line, correlation counter 66 increments binary counter 58 by way of line 70 to begin the count through or search process on the off-line channel. The correctly aligned data stream outputs on lines 72 and 74 are now applied to an errorless or hitless switch 76, to be described, which is activated by an on-line control signal on line 41 in conjunction with the clock signal on line 46 to provide a means of switching to select the optimum channel for the data output on line 78. This is done without interrupting the data signals or introducing additional errors due to switching since this switching occurs only during bit transition times of the now aligned data channels.

Figure 2:
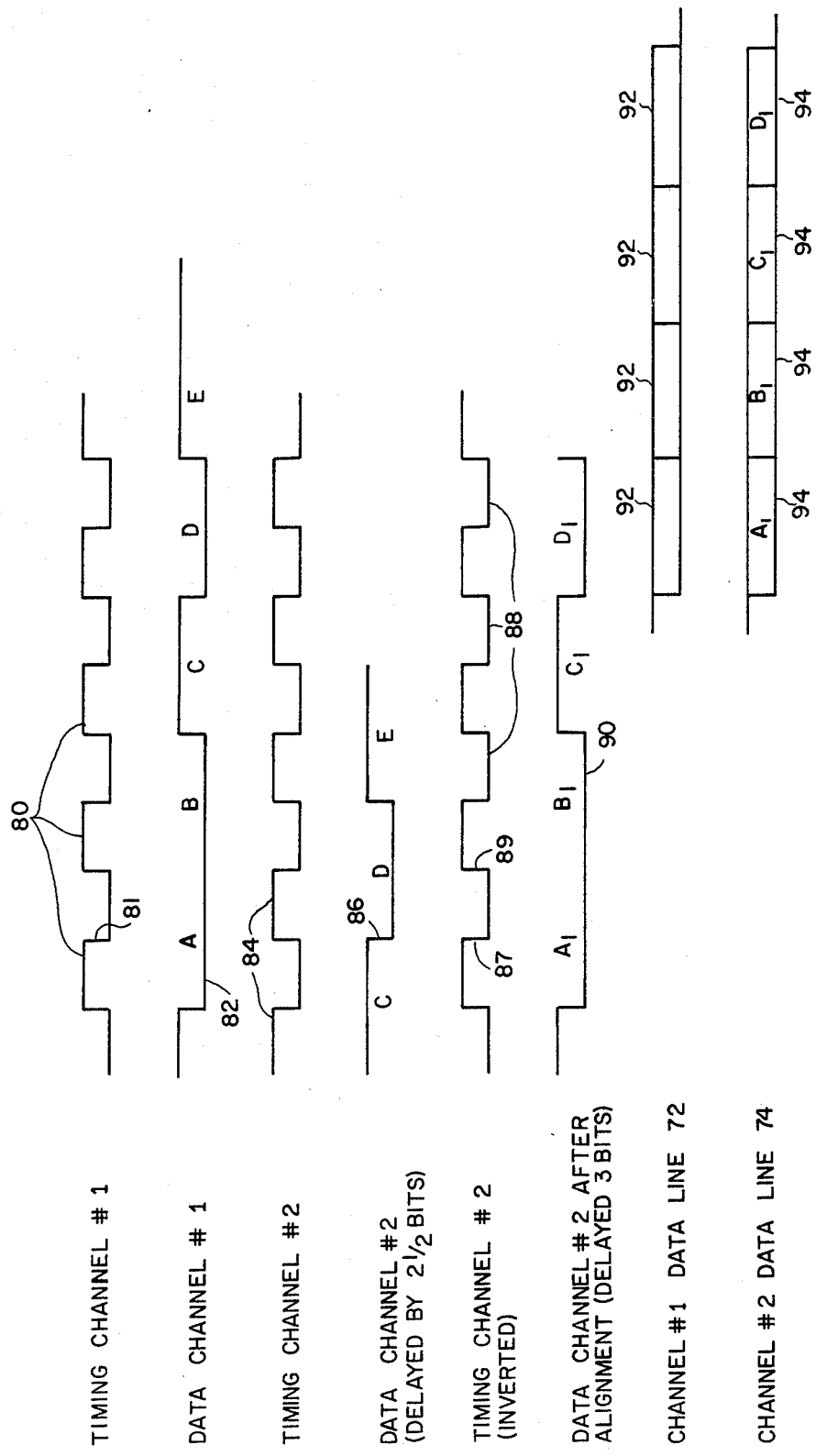
FIG. 2 is a timing diagram for the on-line and off-line channels showing the bit content of the two channels brought into alignment from non-alignment.

Referring now to FIGS. 1 and 2, and to FIG. 2 in particular there is shown a timing diagram showing the off-line channel No. 2 being brought into alignment with on-line channel No. 1 on a bit content basis, as well as at the time of occurrence or transition time for each bit. In particular, timing signal 80 for channel No. 1 is shown with its corresponding data signal 82 for channel No. 1 represented by data bits A through E. Also shown is a timing signal represented by waveform 84 and accompanying clocked data signal 86. It can be seen that the timing signals 80 and 84 are one-half bit or 180° out of phase and thus their corresponding data bits 82 and 86, respectively, are not in phase in time of occurrence. Thus, the bit content 86 of channel No. 2 is for the purposes of this description shown to be delayed by two and one-half bits behind the bit content 82 of channel No. 1. The one-half bit delay is compensated in a novel manner in the exclusive OR circuit 14 which in operation adds a further one-half bit delay by inverting its corresponding timing signal 84 on line 37 of FIG. 1, as previously described.

To align channel No. 1 and No. 2 for the remaining two-bit delay, the multiplexer 56 is delayed an additional two-bits during the aforementioned counting procedure of correlation counter 66. At this time, the bit content as well as the time of occurrence of the two data channels are made to coincide in time of occurrence, as shown by output timing signal 88 and output data signal 90 represented by data bits A1 through D1. It should be noted that these signals representing the output waveforms 88 and 90 appearing respectively, on output lines 72 and 74 of FIG. 1, and shown as data bits 92 and 94 of FIG. 2, are in synchronism but delayed a total of three-bits. It is also noted that the transition or falling edge 81 of timing signal 80 is aligned with the transition or falling edge 87 of timing signal 88. It should be understood that two and one-half bits of delay have been shown for the purpose of separately describing the operation with respect to the one-half and the two-bit delay, thereby resulting in a total delay of three bits as shown by data bits 92 and 94 of FIG. 2.

Figure 3:
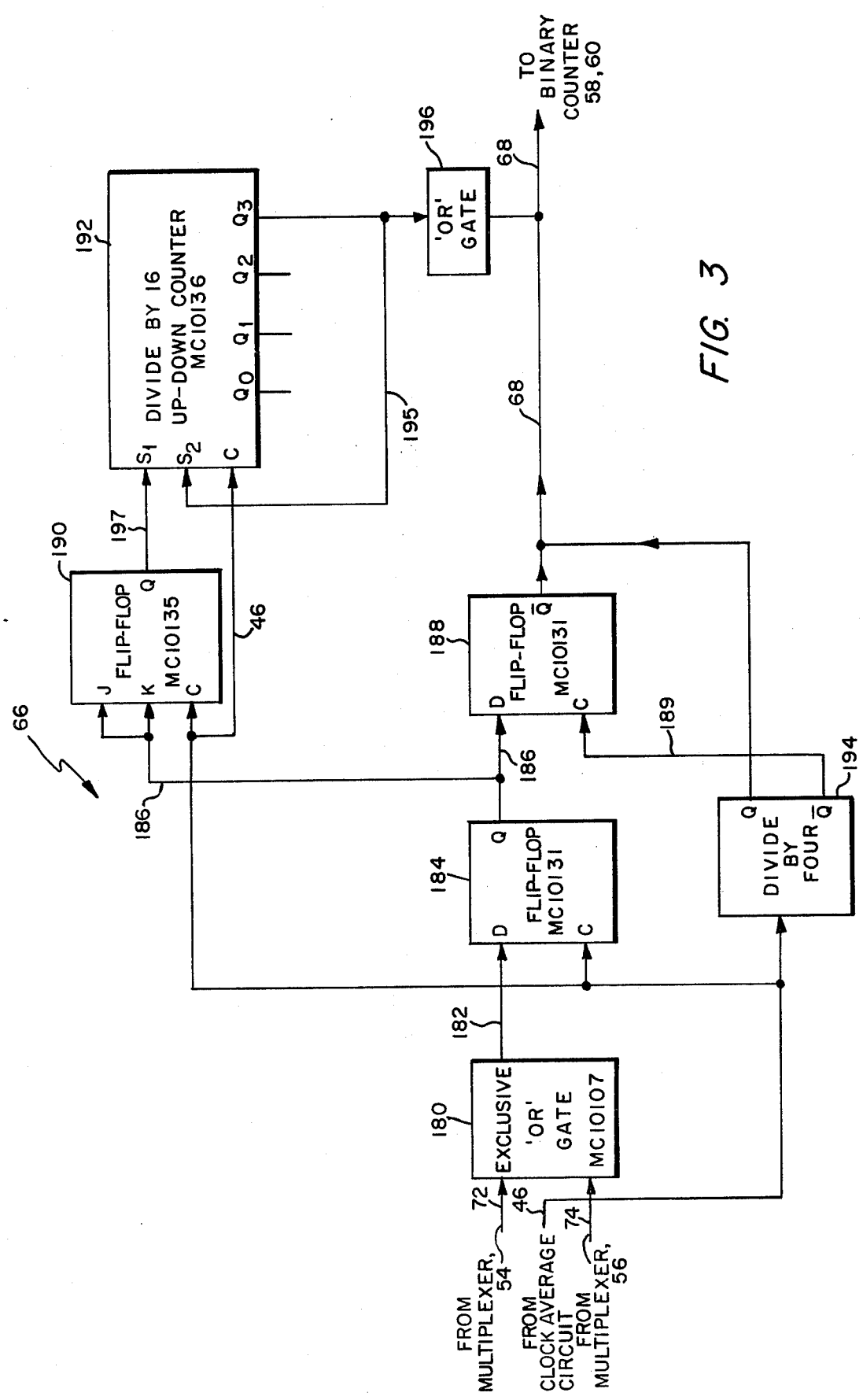
FIG. 3 is a detailed block diagram of the correlation counter of FIG. 1.

Referring to FIG. 3 there is shown a block diagram of the correlation counter 66 of FIG. 1. This correlation counter is used to align the bit content of data stream on line 72 with the bit content of the data stream on line 74. These streams include data No. 1, the on-line data and data No. 2 the off-line data which have been aligned with respect to their transition or time of occurrence by correcting for a delay of one-half bit.

Correction for the remaining two-bit delay of the data content is now accomplished in the following manner. An exclusive OR gate 180 receives the two-bit delayed data from multiplexers 54 and 56 by way of lines 72 and 74 of FIG. 1. Exclusive OR gate 180 provides in a known manner an output signal on line 182 whenever the polarity of the data content of the two input data streams do not coincide. For example, the polarity of off-line data bit C in FIG. 2 does not correspond to the polarity of the on-line data bit A. When this occurs, an error signal is generated on line 182 which subsequently is used in the alignment process. This exclusive OR gate can be Motorola type MC10107. Its output is connected to a conventional flip-flop 184, such as Motorola type MC10131, which is used to correct for any timing inaccuracy resulting from the exclusive OR gate 180 or the action of multiplexers 54 and 56. This retiming is accomplished in response to an average time clock signal on line 46. The Q output of the D type flip-flop 184 is connected by way of line 186 to the input of flip-flop 188, herein shown to be a Motorola type MC10131. Also connected by way of line 186 is a well-known JK flip-flop 190 which is preferably a Motorola type MC10135. This flip-flop in connection with well-known divide-by-sixteen counter 192 performs an additional operation of counting backwards or forward a total number of thirty-two bits to tolerate system errors introduced by atmospheric fading without requiring realignment by the correlation counter.

The actual bit content alignment for the two-bit delay is performed in a novel manner by flip-flop 188 in conjunction with conventional flip-flops, such as Motorola MC10131, connected in a well-known manner to form a divide-by-four counter 194. The output of this circuit on line 68 is a count or clock signal which is fed to the two eight-bit binary counters to cause a change in count or address of the eight-bit multiplexers in a direction to compensate for the two-bit delay in the manner previously described.

In aligning the two data streams, the $\overline{Q}$ output of the divide-by-four counter 194 is used to clock the error signal from flip-flop 184 into flip-flop 188 and to delay or hold the error signal in flip-flop 188 for four clock pulses, equal to two-bits. This delay permits the off-line binary counter 60 of FIG. 1 to advance its count address by one and thus search for another input line instead of previously selected line 64 of FIG. 1. This process continues until the aligned data streams are sensed at lines 72 and 74 by the exclusive OR gate 180. That is, as succeeding bits arrive at the exclusive OR gate 180, they are examined and when a second error in polarity occurs between the off-line data and the on-line data, a second error signal occurs on line 182. This second error signal arrives at flip-flop 188 and is clocked out at the proper time to provide bit content alignment by the divide-by-four timing pulse on line 189. Thus, the two-bit delay in the bit content of the data streams is corrected, one-bit at a time, by the continuously searching channel multiplexers. The correlation counter thus senses or checks the polarity of the bit content of the incoming data streams and provides an error signal which continues until the off-line polarity of the bit content is matched with on-line polarity of its bit content of a period of thirty-two bits. When thirty-two bits of successively correct data occurs, as determined by the output of the divide-by-sixteen counter 192, further error output of flip-flop 188 is inhibited by operation of OR gate 196 which inhibits the error signal on line 68 thus preventing the correlation counter from searching or changing from its present input line. With respect to the divide-by-sixteen counter 192, any incorrect match of data or error occurring for the first sixteen-bits counted, results in the count starting from count one or state zero by a feedback signal on line 195 in conjunction with an error signal on line 197. When the data polarity difference occurs between count 16 and 32, the up-down counter 192 counts down by two as far back as 16. Upon completion of 32 consecutive successful on-line and off-line data matches, the output of OR gate 196 is driven to the logic high or conducting state thus inhibiting line 68 from further incrementing the binary counter 60.

Figure 4:
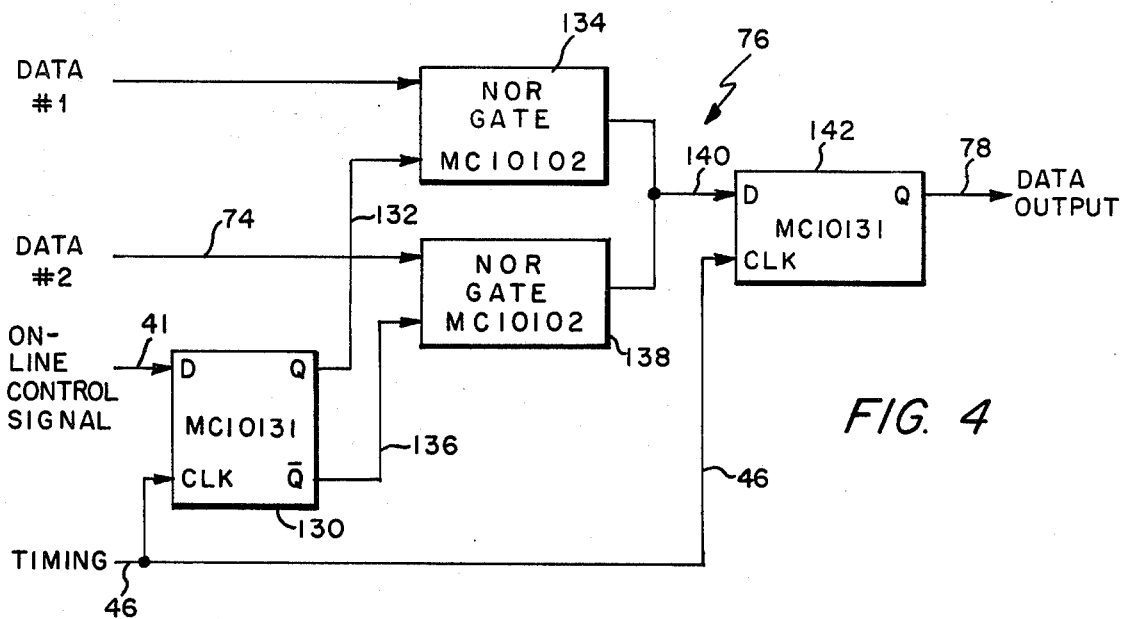
FIG. 4 is a detailed block diagram of a portion of the diversity switch correlation circuit of FIG. 1 showing the errorless switch.

Referring now to FIG. 4 there is shown in greater detail a block diagram of the hitless or errorless switch 76 of FIG. 1. This switch permits either of the data inputs from the eight-bit multiplexers 54 and 56, in lines 72 and 74, respectively, to be transferred to the data output line 78 in an uninterrupted manner, that is without loss of data bits during transfer by the switch. This is accomplished in the following manner. The on-line control signal of line 41 of FIG. 1 appears at the D input of a conventional flip-flop 130, such as Motorola type MC10131. Connected to the Q output of flip-flop 130 by way of line 132 is a conventional NOR gate 134, herein shown as Motorola type MC10102. In a similar manner, output line 136 connects the $\overline{Q}$ output of flip-flop 130 to a second NOR gate 138. The outputs of the two NOR gates are connected together and fed by way of line 140 to the D input of a second flip-flop 142. These components, in combination, provide a simplified block diagram of the errorless switch 76.

In operation, therefore, the data inputs on lines 72 and 74 are selected by NOR gates 134 and 138 in response to a control signal on lines 132 and 136. Selection of data signals on line 72 or line 74 to output line 140 only occurs during the leading edge of the averaged timing signal on line 46 of FIG. 1. For example, when the control signal on line 41 orders data to be switched from line 72 to output line 78 in the middle of a data bit, no transfer of such data is permitted to occur until the subsequent leading edge 89 of FIG. 2 of the averaged timing signal on line 46 triggers the flip-flop 130. This occurs only during the subsequent transition of the aligned data streams. In this manner, an errorless transfer or switch has been made of data from line 72 to the data of line 74 at the output on line 78 without losing a data bit or interrupting the flow of data through the errorless switch. In like manner, data transfer from input line 74 to input line 72 is accomplished when the on-line control signal on line 41 has an opposite polarity as determined by the aforementioned well-known monitoring circuit of the associated receiving system.

Figure 5:
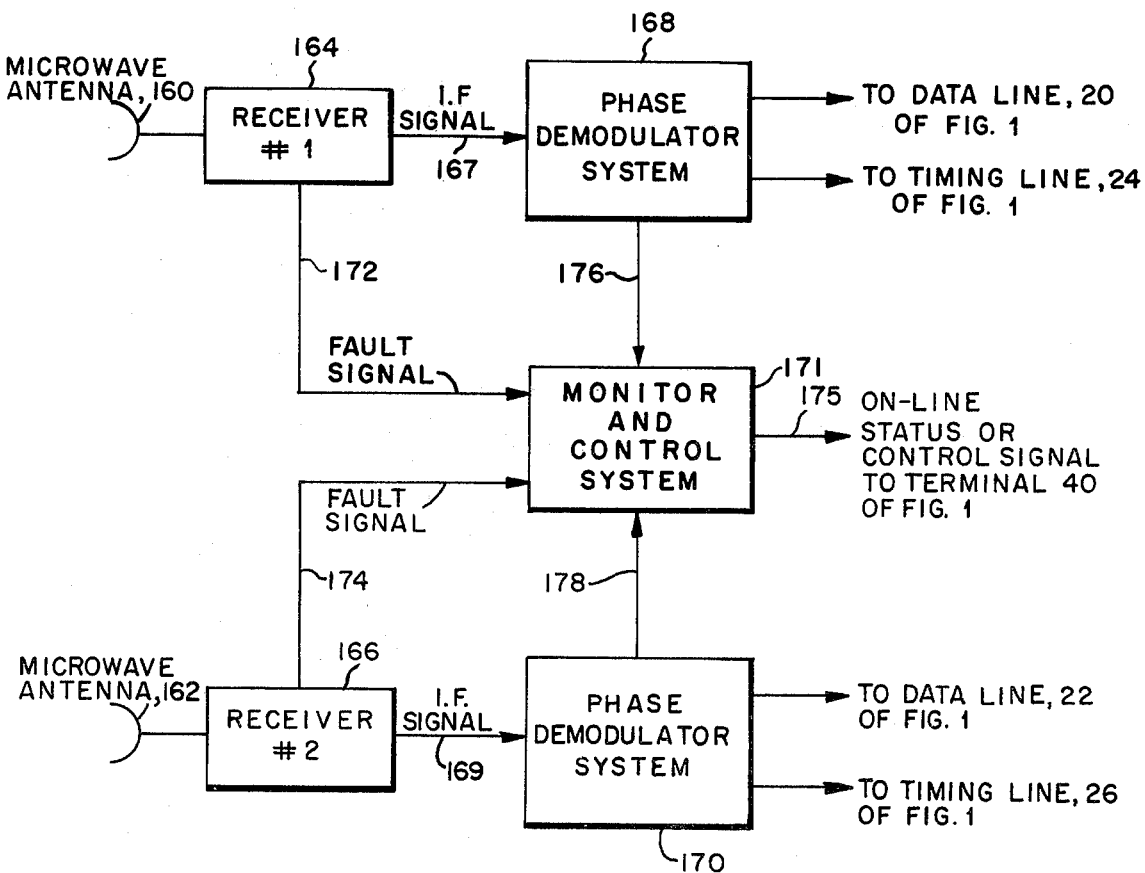
FIG. 5 is a block diagram of a receiving system for use in connection with the diversity switch correlation circuit shown in FIG. 5.

Referring now to FIG. 5, there is shown a conventional dual channel receiving system having dual antennas 160 and 162 forming a well-known space diversity receiving system in conjunction with receiver 164 for channel No. 1 and receiver 166 for chanel No. 2. The IF output signal from the on-line receiver 164 is fed by way of line 167 into a conventional phase demodulator system 168. This system contains a well-known phase demodulator and timing recovery circuit, not shown, which converts the phase shift modulated IF signal from receiver 164 into the data and timing signals originally transmitted by a transmitting system, not shown. These signals appear on data line 20 and timing line 24 of FIG. 1. In like manner, the antenna 162 receives the same transmitted signal as antenna 160 and receiver 166 converts this signal to a phase modulated IF signal which is fed by way of line 169 to the phase demodulator system 170. Data and timing signals for the other data channel are derived and fed to lines 22 and 26, respectively, of FIG. 1. It can be seen that the data and timing signals for each channel contain the same information, one channel of which is delayed with respect to the other channel by the space diversity antenna system and the relative small delays through each receiver. Thus, when switching from one data channel to the other, accurate data alignment is provided in a novel manner to permit switching only at the data transition points of the aligned data. In order to select the optimum data channel from the signals entering the dual antennas, well-known fault and performance monitoring circuits 171, not shown, are contained in each receiver, the inputs of which appear on lines 172 and 174. These signals are fed to a monitor and control system comprising well-known logic gates, not shown, which measure and select the optimum channel to generate the on-line status or control signal at output line 175 which is connected to terminal 40 of FIG. 1. The polarity of the signal on line 175 is determined in a well-known manner by the relative optimum performance of the two receivers. Also entering into the selection are well-known error detectors which monitor digital performance and transmit a fault signal by way of lines 176 and 178 to determine the on-line channel. The information on data lines 20 and 22 of FIG. 1 are thus corrected to the optimum output data on line 78 which is then in a form suitable for transmission to well-known demultiplexing and telephone channel bank systems or other digital utilization, if desired.

While a particular embodiment of the invention has been shown and described, various modifications thereof will become apparent to those skilled in the art and, therefore, it is not intended that the invention be limited to the disclosed embodiment or to details thereof, and departures may be made therefrom within the spirit and scope of the invention, as defined in the appended claims.

What is claimed is:

1. A diversity channel switching system for use in a diversity channel receiving system comprising:
   a first data bit channel adapted to carry on-line data bit signals from said receiving system;
   a second data bit channel adapted to carry off-line data bit signals from said receiving system;
   delay means in series with each data bit channel to provide a one-half or one-bit delay in response to a change in the polarity of respective control signals applied thereto;
   timing signal lines for providing timing signals for each of said data bit channels;
   an exclusive OR circuit coupled to each delay means and adapted to select said one-half or one-bit delay with respect to the transition time of the bit content in said first and second data bit channels;
   phase comparison loop means for providing an error signal representative of the phase difference between on-line and off-line data bit signals;
   means for applying said error signal to said exclusive OR circuit, said error signal having a polarity to select the delay in the data bit channel to bring the time of occurrence of the off-line data bit signals in phase with the on-line data bit signals; and
   switching means connected to the output of said on-line and off-line channels and adapted to switch in a substantially error-free manner the aligned bit content of either said first channel or said second channel to an output channel.

2. A diversity channel switching system for use in a diversity channel receiving system comprising:
   a first data bit channel adapted to carry on-line data bit signals from said receiving system;
   a second channel adapted to carry off-line data bit signals from said receiving system;
   delay means in series with each data bit channel to provide a predetermined delay in response to a change in respective control signals applied thereto;
   timing signal lines for providing timing signals for said first and second data bit channels;
   a distinct exclusive OR circuit coupled respectively to each delay means and adapted to select a predetermined delay with respect to said first and second channels;
   phase comparison means providing an error signal representative of the phase difference between said on-line and off-line data bit signals;
   means in response to said error signal to provide said control signals to said exclusive-OR circuits to bring the time of occurrence of the off-line data bit signals in phase with the on-line data bit signals; and
   switching means connected to the output of said on-line and off-line channels and adapted to switch the aligned bit content of either of said first channel or said second channel to an output channel.

3. A diversity channel switching system for use in a diversity channel receiving system comprising:
   a first channel adapted to carry data bit signals;
   a second channel adapted to carry data bit signals;
   means in series with said first and second channels to provide a predetermined delay in either said first or second channel in response to a change in respective control signals applied thereto;
   timing signal lines for providing timing signals for said first and second channels;
   a single distinct exclusive OR circuit coupled respectively to each of the corresponding delay means for said first channel and said second channel, to select a predetermined delay with respect to the time of occurrence of information bits on said first and second channels;
   phase comparison means adapted to provide an error signal in response to a phase difference in the timing signals of said first and second channels;
   means coupled respectively to each exclusive OR circuit to provide said control signals in response to said error signal so that the data bit signals of said first and second channels coincide in time of occurrence;
   means for comparing the data bit content of a predetermined number of consecutive bits in each channel to provide a difference signal in response to the polarity of non-matched bits;
   means in response to said difference signal to delay one data channel with respect to the other data channel until the bit content of said one data channel becomes aligned with the bit content of the other; and
   switching means connected to the output of said first and second channels and adapted to switch in a substantially error-free manner the aligned bit content of either said first channel or said second channel to an output channel.

4. A diversity channel switching system comprising:
   a first delay device adapted to receive data bit signals from a first data channel;
   a second delay device adapted to receive data bit signals from a second data channel;
   first and second exclusive OR devices coupled to the respective first and second delay devices;
   a first timing signal line connected to an input of the first exclusive OR device and a second timing signal line connected to an input of the second exclusive OR device;

phase detector means coupled to detect the phase difference between timing signals on said first and second timing signal lines to provide an error signal representing the difference in time of occurrence of data bit signals on said first and second data channels;

logic means in response to said error signal exceeding a predetermined phase difference to transmit a control signal to one of said first and second exclusive OR devices, means including multiplexer means to provide a delay in order to align the time of occurrence of a plurality of said data bit signals of said first data channel and corresponding data bit signals of said second data channel; and switching means connected to the output of said first and second data channels and adapted to switch in a substantially error-free manner the data bit signals of either of said first or said second data channels to an output channel.

5. A diversity channel switching system comprising:
a first delay device adapted to receive data bit signals from a first data channel;
a second delay device adapted to receive data bit signals from a second data channel;
first and second exclusive OR devices coupled to the respective first and second delay devices;
a first timing signal line connected to an input of the first exclusive OR device and a second timing signal line connected to an input of the second exclusive OR devices;
phase detector means coupled to detect the phase difference between timing signals on said first and second timing signal lines to provide an error signal representing the difference in time of occurrence of information bits on said first and second data channels;
an on-line channel for transmitting an on-line control signal representing a predetermined level of performance;
means in response to said error signal exceeding a predetermined phase difference to transmit a control signal to one of said first or second OR devices as determined by said on-line control signal;
means including the selected exclusive OR device acting in response to said error signal to provide a predetermined delay by the associated delay device to align the time of occurrence of said data bit signals of said first data channel and said second data channel;
means including multiplexer means for comparing the bit content of a plurality of said data bit signals of said first and said second data channel to provide a difference signal in response to a difference in the alignment of the bit content;
means in response to said difference signal to delay simultaneously the bit content of a predetermined number of data bit signals of one data channel with the other thereby to simultaneously correlate serial data of each on a bit-by-bit basis; and
means for switching data bit signals of said on-line channel to an output channel.

6. A diversity channel switching system comprising:
first and second data bit channels;
delay means coupled to each data bit channel adapted to provide a first delay and a second delay to each data bit stream;
first and second timing lines to provide a timing signal for each data bit in the associated data bit channel;
first and second exclusive OR gates having first inputs connected respectively to said first and second timing lines to invert the timing signal applied thereto in response to a signal at another input of said first and second exclusive OR gates;
phase detector means for comparing the phase of the first and second timing signals to provide a difference signal;
means including logic means to transmit said difference signal to the other input of said first and second exclusive OR gates to actuate said delay means to initiate a delay adapted to align the transition times of said first and second data bit channels; and
means for switching data bit signals from either said first or said second data bit channels to an output channel.

7. A diversity channel switching system in which bit transitional alignment differences to at least a half-bit and bit content differences over at least a three bit range are aligned which includes:
first and second data bit lines;
timing signal lines for providing timing signals for each of said data bit lines;
an exclusive OR circuit coupled to said timing signal lines to select a predetermined delay with respect to the transition time of the bit content in said first and second data bit lines;
phase comparison means adapted to provide an error signal in response to phase difference of said timing signals;
means including said exclusive OR circuit acting in response to said error signal to provide that the transition times of the bit content of said first and second data bit lines coincide in time of occurrence;
means for comparing the data bit content of a predetermined number of bits in each of said first and second data bit lines to provide a difference signal in response to the polarity of nonmatched bits;
means in response to said difference signal to delay the bit content of one data bit line with respect to the other; and
means for switching the bit content of either said first or said second data bit lines to an output channel.

8. a diversity channel switching system for use in a diversity channel system comprising:
a first channel adapted to carry data bit signals;
a second channel adapted to carry data bit signals;
delay means in each data channel adapted to provide a predetermined delay;
first and second timing channels adapted to carry timing signals corresponding respectively to said data bit signals of said first and second channels;
phase comparison means for comparing said timing signals for the first channel and said second channel to provide a difference signal;
an exclusive OR circuit coupled respectively to each delay means and actuated by said difference signal having a polarity to select a delay adapted to compensate for a difference in time of occurrence of said data bit signals of said first and second channels; and switching means connected to said first and said second channel and adapted to switch the data bit signals of said first or said second channels to an output channel.

9. In combination:
a first channel adapted to carry data bit signals;
a second channel adapted to carry data bit signals;
delay means in each data channel adapted to provide a predetermined delay;
first and second timing channels adapted to carry timing signals corresponding respectively to said data bit signals;
phase comparison means for comparing said timing signals for the first channel and said second channel to provide a difference signal;
a single exclusive OR circuit coupled respectively to each delay means and actuated by a timing signal and said difference signal having a polarity to select a delay adapted to compensate for a difference in time of occurrence of said data bit signals of said first and second channels;
means for comparing the data bit content of said first channel and said second channel to provide a control signal and
means coupled to said data bit content comparison means and responsive to said control signal to align the bit content of one stream of data bit signals to correspond to the bit content of the other.

10. A diversity channel switching system comprising:
a first channel adapted to carry data bit signals;
a second channel adapted to carry data bit signals;
delay means in each data channel adapted to provide a predetermined delay;
first and second timing channels adapted to carry timing signals corresponding respectively to said data bit signals;
phase comparison means for comparing said timing signals for the first channel and said second channel to provide a difference signal;
a single distinct exclusive OR circuit coupled respectively to each delay means and actuated by said difference signal having a polarity to select a delay adapted to compensate for a difference in time of occurrence of said data bit signals to said first and second channels;
means including first and second shift registers connected respectively to first and second multiplexers, said multiplexers being coupled to a correlation counter adapted to count comparisons of the polarity of non-matched data bit content in the output of said first and second multiplexers to provide a control signal;
means responsive to said control signal to shift the bit content of one stream of data bit signals forward and backward with respect to the bit content of the other, thereby to align the bit content of each channel on a bit-by-bit basis; and
switching means connected to said first and second channels and adapted to switch the aligned bit content of one of said channels to an output channel.

11. A diversity channel communication system having a switch for switching one of two data streams to an output channel comprising:
means for receiving data bit signals from a first channel;
means for receiving data bit signals from a second channel, the data bit signals of said first channel being asynchronous and non-correlated with respect to the data bit signals of said second channel;
delay means in series with each data bit channel to provide a predetermined delay in response to a change in control signals applied thereto;
means including an exclusive OR circuit adapted to provide said control signals and thereby select a predetermined delay provided by said delay means;
phase comparison means for providing an error signal representative of the phase difference of data bit signals in said first channel and said second channel;
means for applying said error signal to said exclusive OR circuit to provide said control signals to initiate said predetermined delay thereby bringing the time of occurrence of off-line data bit signals in phase with the on-line data bit signals.

12. The apparatus of claim 11 further comprising means including means for comparing the data bit content of a predetermined number of bits in each of said first and second channels to provide a difference signal; and
means in response to said difference signal to align the data bit signals of one channel to the bit content of the other.

13. A diversity channel communication system having a switch for switching one of two data systems to an output channel comprising:
a first receiver including an antenna for receiving a portion of a transmitted signal;
a second receiver including an antenna for receiving another portion of said transmitted signal;
means connected to the output of each receiver to provide data bit signals in first and second data bit channels;
monitor means coupled to said first receiver and said second receiver and adapted to select the signals from the data bit channel providing channel signals above a predetermined level of performance, and to develop therefrom an on-line control signal;
a first delay device adapted to receive data bit signals from said first data bit channel;
a second delay device adapted to receive data bit signals from said second data bit channel;
first and second exclusive OR devices coupled to the respective first and second delay devices;
a first timing signal line connected to an input of the first exclusive OR device and a second timing signal line connected to an input of the second exclusive OR device;
phase detector means coupled to detect the phase difference between timing signals on said first and second timing signal lines to provide an error signal representing the difference in time of occurrence of the data bit signals of said first and second data bit channels;
control line for transmitting said on-line control signal representing a predetermined level of performance;
means to apply said error signal to one of said first or second exclusive OR devices to provide a control signal;
means including the selected exclusive OR device acting in response to said error signal to provide a predetermined delay by the associated delay device to align the time of occurrence of said data bit signals of said first data channel and said second data bit channel;

means including correlation means for comparing the bit content of a sequence of said data bit signals of said first and said second data bit channels to provide a difference signal in response to a difference in the bit content of said sequence; and means including multiplexer means operating in response to said difference signal to simultaneously delay the bit content of a predetermined number of data bits of said sequence in one data bit channel with respect to the other thereby to correlate serial data of each channel.

14. In combination:

a first channel adapted to carry data bit signals;

a second channel adapted to carry data bit signals;

delay means in series with each channel adapted to provide a first delay and a second delay, respectively;

means including an exclusive OR circuit coupled to select a predetermined one of said first delay and said second delay in response to an error signal to compensate for difference in time of occurrence of data bit signals in said first channel and said second channel;

phase comparison means adapted to provide said error signal in response to a phase difference related to the timing of the data bit signals of said first and second channels;

means for comparing the data bit content of a predetermined number of bits in said first and second channels to provide a difference signal in response to the polarity of non-matched bits; and means in response to said difference signal to align the bit content of the first and second channels.

* * * * *